(12) United States Patent
Goshima

(10) Patent No.: US 6,943,209 B2
(45) Date of Patent: Sep. 13, 2005

(54) VIBRATION-INSULATING RUBBER MOLDED PRODUCT FOR USE IN AUTOMOBILE

(75) Inventor: Yasuhiro Goshima, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 301 days.

(21) Appl. No.: 10/199,112

(22) Filed: Jul. 22, 2002

(65) Prior Publication Data

US 2002/0183422 A1 Dec. 5, 2002

Related U.S. Application Data

(63) Continuation of application No. 09/641,392, filed on Aug. 18, 2000, now abandoned.

(30) Foreign Application Priority Data

Aug. 20, 1999 (JP) .......................................... 11-234303

(51) Int. Cl.⁷ ................................................ C08K 3/04
(52) U.S. Cl. ...................... 524/495; 524/492; 524/571; 524/574
(58) Field of Search ................................ 524/492, 495, 524/571; 529/574

(56) References Cited

U.S. PATENT DOCUMENTS 4,769,179 A * 9/1988 Kato et al. ................... 252/609
5,064,905 A   11/1991 Stamhuis et al. ............. 525/237
5,094,829 A    3/1992 Krivak et al. ................ 423/339
5,605,950 A *  2/1997 Evans et al. ................. 524/492

FOREIGN PATENT DOCUMENTS

JP           A5239289           9/1993

* cited by examiner

Primary Examiner—David W. Wu
Assistant Examiner—Rip A. Lee
(74) Attorney, Agent, or Firm—Birch, Stewart, Kolasch & Birch, LLP

(57) ABSTRACT

The present invention provides a vibration-insulating rubber molded product having flash, where a thicker portion of the flash can be easily evaluated by visually observing a light-transmittance thereof to prevent the product from 5 cracking, and to find damage of a mold used for forming the product with ease.

The vibration-insulating rubber molded product of the present invention comprises a rubber component, a silica powder and a carbon black. The content of the carbon black is determined such that (a) a portion having a thickness of 1 mm or less in the flash is substantially transparent or translucent with white or gray color, and that (b) a portion having a thickness of 2 mm or more in the flash is substantially opaque with black color, whereby whether the flash includes a portion having a thickness of 2 mm or more can be evaluated by visual observation.

5 Claims, 9 Drawing Sheets

(a)

(b)

VIBRATION-INSULATING RUBBER MOLDED PRODUCT FOR USE IN AUTOMOBILE

This application is a continuation of application Ser. No. 09/641,392, filed on Aug. 18, 2000, now abandoned, the entire contents of which are hereby incorporated by reference and for which priority is claimed under 35 U.S.C. §120; and this application claims priority of Application No. 11-234303 filed in Japan on Aug. 20, 1999 under 35 U.S.C. §119.

BACKGROUND OF THE INVENTION

1. Field of the Invention

The present invention relates to a vibration-insulating rubber molded product for use in an automobile, etc., particularly to a vibration-insulating rubber molded product having flash, where defects such as damage of a mold used for forming the product can be easily found by visually observing the flash.

2. Description of the Related Art

When parts such as an engine are installed in an automobile body, a vibration-insulating rubber molded product is generally inserted therebetween to insulate the parts from vibration. Since the vibration-insulating rubber molded product for the engine is exposed to a high temperature, the product is required to have excellent heat resistance. Thus, an ethylene-propylene-diene rubber (EPDM), etc. has been widely used therefore.

As a rubber composition for such a vibration-insulating rubber molded product, Japanese Patent Laid-Open, No. 5-239289 has proposed a vulcanizable rubber composition comprising: an ethylene-propylene-nonconjugated diene rubber or a blend of an ethylene-propylene-nonconjugated diene rubber and a diene rubber; a particular alkoxysilane compound; and fine powdery silicic acid and/or a silicate having specific surface area of 5 to 100 m²/g (BET adsorption).

The rubber composition further comprises 0.1 to 60 weight % of a carbon black having specific surface area of 5 to 90 m²/g with excellent dynamic properties, mechanical strength, dynamic fatigue resistance, heat aging characteristics, etc.

However, according to specific examples described in Japanese Patent Laid-Open No. 5-239289, the rubber composition comprises 20 to 40 weight % of the carbon black, and is entirely opaque with black color. A portion having a thickness of approximately 1 mm or less in flash of the molded product produced therefrom is also substantially opaque, therefore, the thickness of the flash cannot be evaluated by visual observation.

In general, the vibration-insulating rubber molded product is produced by a insert molding method to stick it integrally on a frame of a part. The insert molding method comprises the steps of placing the frame of the part in a cavity of a mold, injecting the rubber composition thereinto, and integrally forming them. On the outskirt of thus-obtained rubber molded product, the flash is unavoidably formed along mold-releasing surfaces of the mold. In the case where it is normally formed, in other words, in the case where the mold does not have any damage such as cutout, the thickness of the flash is almost 1 mm or less. In contrast, in the case of a mold with damage, the thickness of the flash corresponding to the damage comes to be thicker. The thicker portion of the flash is apt to be degraded by heating and become cracked, thereby often causing rupture of the entire vibration-insulating rubber molded product.

If the thickness of the flash can be easily evaluated, it becomes possible to prevent the vibration-insulating rubber molded product from cracking, and to find the damage of the mold causing increase of the thickness. However, the conventional vibration-insulating rubber molded product comprises the silica powder without carbon black to be white, or comprises a large amount of carbon black to be black. Consequently, the thickness of each portion of the flash must be measured to find the thicker portion, and it is difficult to easily evaluate whether the flash includes the thicker portion.

SUMMARY OF THE INVENTION

An object of the present invention is to provide a vibration-insulating rubber molded product having flash, where a thicker portion of the flash can be easily evaluated by visually observing a light-transmittance thereof to prevent the product from cracking, and to easily find damage of a mold used for forming the product.

As a result of intense research in view of the above object, the inventor has found that silica powder and carbon black is added to a rubber composition for a vibration-insulating rubber molded product to increase heat resistance, mechanical strength, durability, etc., and the content of the carbon black is adjusted such that a normal thinner portion of the flash is substantially opaque, whereby it becomes possible to find a thicker portion due to an ill-conditioned mold by only visually observing the color of the flash. The present invention has been accomplished by this finding.

Thus, a vibration-insulating rubber molded product having flash of the present invention comprises a rubber component, silica powder and carbon black, wherein the content of the carbon black is determined such that (a) a portion having a thickness of 1 mm or less in the flash is substantially transparent or translucent with white or gray color, and that (b) a portion having a thickness of 2 mm or more in the flash is substantially opaque with black color, whereby whether the flash includes a portion having a thickness of 2 mm or more can be evaluated by visual observation. Specifically, the contents of the silica powder and the carbon black are preferably determined so that a light-transmittance of the flash is 20% or more in a portion having a thickness of 1 mm, and 5% or less in a portion having a thickness of 2 mm.

According to a preferred embodiment of the present invention, the content of the silica powder is 20 to 70 phr and the content of the carbon black is 0.5 to 10 phr, preferably 1 to 3 phr per 100 parts of the rubber component, and the weight ratio of the carbon black/the silica powder is 20/80 to 0.5/99.5. The preferred rubber component is an ethylene-propylene-diene rubber having a weight-average molecular weight of 400,000 or more. It is preferable that the vibration insulating rubber molded product of the present invention further comprises 3 to 8 weight % of a coupling agent based on 100 weight % of the silica powder.

DETAILED DESCRIPTION OF THE PREFERRED EMBODIMENTS

[1] Rubber Composition

Figure 1:
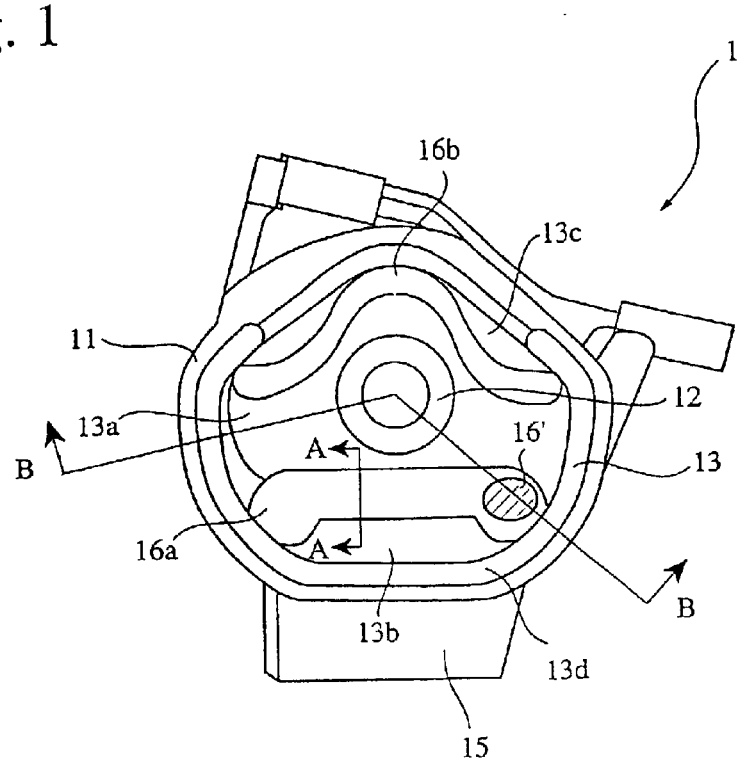
FIG. 1 is a front view showing a vibration-insulating rubber molded product for an engine according to one embodiment of the present invention.

A rubber composition for a vibration-insulating rubber molded product of the present invention comprises a silica powder and a carbon black in addition to a rubber component, and may comprise a coupling agent if necessary. Each component of the rubber composition will be described in.

(A) Rubber Component

As the rubber components, olefin rubbers such as ethylene-propylene diene rubbers (EPDM), natural rubbers (NR), styrene-butadiene rubbers (SBR), butadiene rubbers (BR), isopropylene rubbers (IR), acrylonitrile-butadiene rubbers (NBR), diene rubbers such as chloroprene rubbers (CR), etc. can be used in the present invention. Among them, preferred is EPDM with an excellent heat-resistance and durability, and low dynamic ratio.

The mole ratio of ethylene/propylene in EPDM is preferably 30/70 to 60/40.

The balance is substantially diene, preferably nonconjugated diene. If the content of the nonconjugated diene is represented by an iodine value, the iodine value is generally 8 to 30, preferably 8 to 25.

Specific examples of the nonconjugated diene include: chain nonconjugated dienes such as 1,4-hexadiene, 1,6-octadiene, 2-methyl-1,5-hexadiene, 6-methyl-1,5-heptadiene, 7-methyl-1,6-octadiene, etc.; cyclic nonconjugated dienes such as cyclohexadiene, dicyclopentadiene, methyl tetrahydroindene, 5-vinylnorbornene, 5-ethylidene-2-norbornene, 5-methylene 2-norbornene, 5-isopropylidene-2-norbornene, 6-chloromethyl-5-isopropenyl-2-norbornene, etc.; and trienes such as 2,3-diisopropylidene-5-norbonene, 2-ethylidene-3-isopropylidene-5-norbonene, 2-propenyl-2, 2-norbornadiene, 1,3,7-octatriene, 1,4,9-decatriene, etc. Among them, preferred are 1,4-hexadiene and the cyclic nonconjugated dienes, particularly 5-ethylidene-2-norbornene.

EPDM for the rubber component preferably has a weight-average molecular weight of 400,000 or more. By using such a high molecular weight EPDM with longer free length and reduced terminal groups, (i) the hysteresis loss at vibrating is reduced to improve the dynamic ratio, (ii) the fatigue endurance to vibration is improved, and (iii) the mechanical strength is increased. Consequently, the amount of the silica powder added to the rubber composition can be reduced, thereby reducing the hysteresis loss at vibrating and lowering the dynamic ratio.

(B) Silica Powder

The silica powder is added to the rubber composition in order to reinforce the vibration-insulating rubber molded product. The average particle size of the silica powder is preferably 7 to 15 $\mu$m. In general, the content of the silica powder per 100 parts of the rubber component is preferably 20 to 70 phr, more preferably 40 to 60 phr. When the content is less than 20 phr, the hardness and mechanical strength of the rubber composition are both insufficient. On the other hand, when the content is more than 70 phr, the rubber composition is so hard that the damping properties are lowered.

(C) Carbon Black

The carbon black is added to the rubber composition in order to increase the thermal conductivity thereof. Examples of the carbon black include SRF, GPF, FEF, HAF, ISAF, SAF, FT, MT, etc.

The content of the carbon black is determined such that (a) a portion having a thickness of 1 mm or less in the flash of the vibration-insulating rubber molded product is substantially transparent or translucent with white or gray color, and that (b) a portion having a thickness of 2 mm or more in the flash is substantially opaque with black color, whereby whether the flash includes a portion having a thickness of 2 mm or more can be evaluated by visual observation. In the case where the vibration-insulating rubber molded product is regularly formed, the flash generally has a thickness of 1 mm or less. In contrast, in the case of the mold with damage such as cutout, etc., the thickness of the flash corresponding to the damage comes to be thicker therein. The thicker portion due to the ill-conditioned mold generally has a thickness of 2 to 3 mm. Such a thicker portion of the flash is apt to be degraded by heating and become cracked, thereby often causing rupture of the entire rubber molded product.

Therefore, the light-transmittance of the rubber composition is determined such that the thicker portion of the flash can be found by visual observation with ease in the present invention.

Specifically, a normal flash mentioned above as (a) generally has a thickness of 0.3 to 0.5 mm, and is substantially transparent or translucent with white or gray color. Quantitatively, the light-transmittance of the portion having a thickness of 1 mm in the flash is preferably 20% or more. On the other hand, the thicker portion of the irregular flash mentioned above as (b) is substantially opaque with black color. Quantitatively, the light-transmittance of the flash is preferably 5% or less in the portion having a thickness of 2 mm.

In general, the light-transmittance of the flash is linearly changed in a range of 5 to 20% in a thickness range of 1 to 2 mm. The thickness of the irregular portion caused by the ill-conditioned mold is 2 mm or more, and is seldom in the range of 1 to 2 mm in most cases.

The content of the carbon black determined as above is specifically 0.5 to 10 phr, preferably 1 to 3 phr per 100 parts of the rubber component. The weight ratio of the carbon black/the silica powder is generally 20/80 to 0.5/99.5, preferably 10/90 to 2/98. Under this condition, the rubber composition exhibits a high thermo-resistance, and has excellent fatigue endurance and durability at high temperature. Additionally, an irregular portion of the flash can be easily evaluated by visual observation.

(D) Coupling Agent

The coupling agent added to the rubber composition, if necessary may be an alkoxysilane compound, a so-called silane coupling agent. Specific examples of the coupling agent include bis-3-(trimethoxysilyl)propyl-tetrasulfane, bis-3-(triethoxysilyl)propyl-tetrasulfane, bis-3-(tripropoxysilyl) propyl-tetrasulfane, etc. The coupling agent acts to improve dispersion properties onto the rubber composition of the additives such as the silica powder and the carbon black. The weight ratio of the coupling agent is preferably 3 to 8 weight % based on 100 weight % of the silica powder.

(E) Other Additives

Additionally, the rubber composition used in the present invention may comprise additives such as a vulcanizer (a cross-linking agent), a vulcanizing auxiliary, a vulcanizing regulator, an aging inhibitor, an anti-oxidizing agent, a reinforcing agent, etc.

Preferred as the vulcanizer are organic peroxides. Of the organic peroxides, for example, benzoyl peroxide, lauroyl peroxide, di-t-butyloyl peroxide, acetyl peroxide, t-butyl peroxybenzoate, dicumyloyl peroxide, peroxybenzoic acid, peroxyacetic acid, t-butyl peroxypivalate, etc. are preferable. Further, diazo-compounds such as azobisisobutyronitrile are also preferably used as the vulcanizer.

The vulcanizing regulator is used to suppress undesirable earlier vulcanizing. Examples of the vulcanizing regulator include: thiazole compounds such as mercaptobenzothiazole (MBT), dibenzothiazyl disulfide (MBTS) and 2-mercaptobenzothiazole-zinc salt (ZnMBT); sulfenylamides such as N-cyclohexyl-2-benzothiazole sulfenylamides (CBS); thiurams such as tetramethylthiuram monosulfide (TMTM), tetramethylthiuram disulfide (TMTD), tetraethylthiuram disulfide (TETD), tetrabutylthiuram disulfide (TBTD) and dipentamethylenethiuram tetrasulfide (DPTT); etc. Additionally, an aldehyde and an amine, a guanidine compound, etc. are used together with the vulcanizing regulator.

Preferred as the vulcanizing auxiliary are metal oxides such as zinc oxide, etc. The aging inhibitor acts to prevent the rubber composition from senescence such as hardening, softening, developing of cutout, loss of elasticity, etc. after vulcanizing. The aging inhibitor is preferably 2-mercaptobenzoimidazole-zinc salt (MBZ), 2,2,4-trimethyl-1,2-dihydroquinoline polymeric product (TMDQ), N,N'-diphenyl p-phenylenediamine (DPPD), p-phenylenediamines, etc.

[2] Structure of Vibration-Insulating Rubber Molded Product

FIG. 1 shows a vibration-insulating rubber molded product for an engine according to one embodiment of the present invention. This vibration-insulating rubber molded product 1 has an outer barrel 11 and an inner barrel 12 of metal, and a rubber part 13 integrally formed therebetween. The rubber part 13 is composed of: a rubber portion 13a adhered to the inner barrel 12; a pair of rubber portions 13b and 13c disposed on the both side of the rubber portion 13a at an interval; and a fringe 13d adhered to the outer barrel 11, which is integral with the rubber portions 13a to 13c. Further, the product 1 has fixtures such as a suspension arm 15 on the outer surface of the outer barrel 11. The flashes 16a and 16b are formed between the rubber portions 13a and 13b, or between the rubber portion 13a and 13c, respectively.

Figure 2:
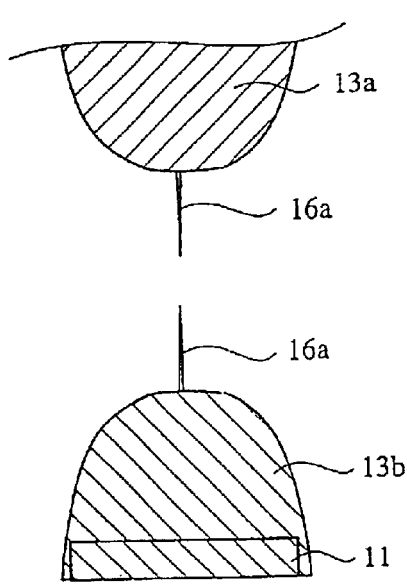
FIG. 2 is an A—A cross-sectional view of FIG. 1.

FIG. 2 is an expanded A—A cross-sectional view of FIG. 1. The flashes 16a are each formed on the mold-releasing surfaces of the rubber portions 13a and 13b. In the portion where the interval between the rubber portions 13a and 13b is narrow, each of the flashes may be connected. This is similar for the case of the flash 16b. Accordingly, both of the flashes 16a and 16b is called as "the flash 16" below unless any notice is given.

Figure 3:
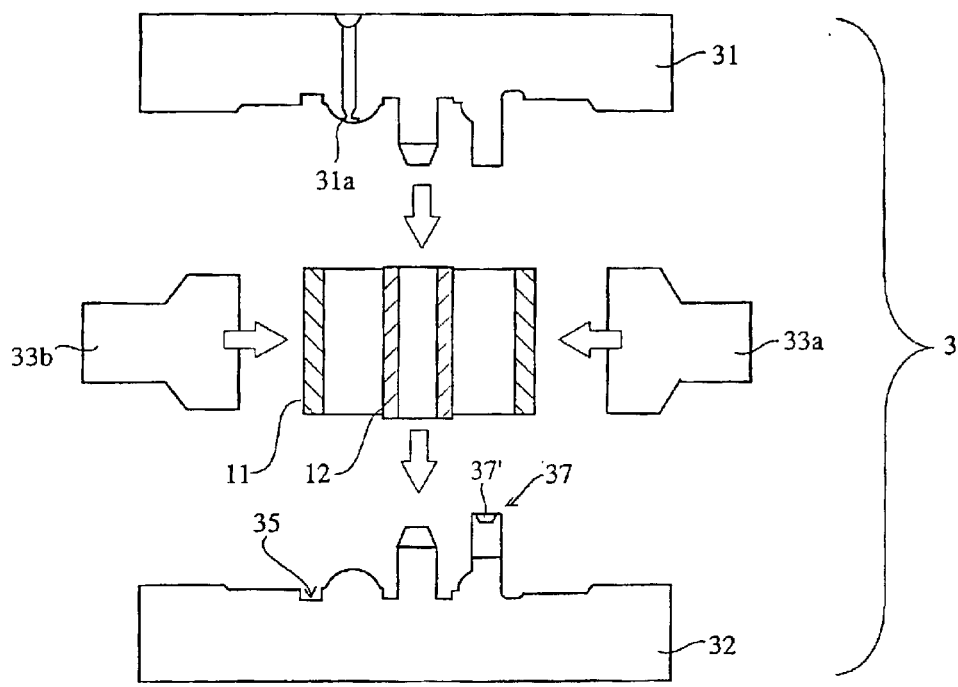
FIG. 3 is a cross-sectional view showing a mold for forming the vibration-insulating rubber molded product of FIG. 1.
Figure 3:
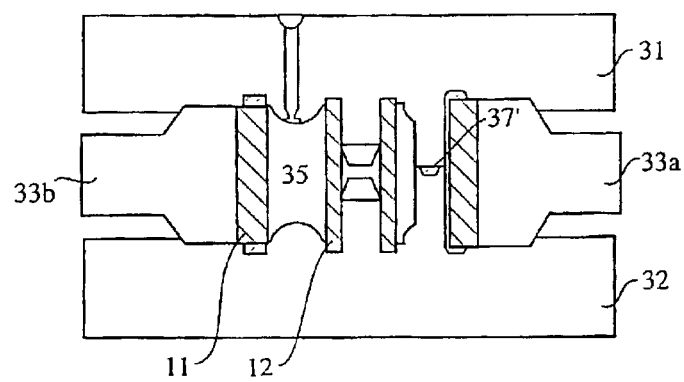

FIG. 3 is a cross-sectional view showing injection molding the vibration-insulating rubber molded product of FIG. 1. FIG. 3(a) shows an opening mold 3, and FIG. 3(b) shows a closed mold 3 corresponding to the B—B cross-section of FIG. 1. The mold 3 is composed of: an upper mold 31 having an injection gate 31a for the rubber composition; a lower mold 32; and a pair of middle molds 33a and 33b. The outer barrel 11 and the inner barrel 12 are placed in a cavity 35 of the mold 3. As shown in FIGS. 1 and 3, the mold 3 has a contact portion 37 in which the upper mold 31 comes in contact with the lower mold 32 to make a space between the adjoining rubber portions. The rubber composition penetrates to the crevice of the contact portion 37, thereby forming the flash 16 therein. In the case of a regular mold 3, the crevice is quite small so that the thickness of the flash 16 is approximately 0.3 to 0.5 mm.

On the other hand, in the case of the mold 3 where any of the upper mold 31 and the lower mold 32 has damage such as a cutout in the contact portion 37 as shown in FIG. 3, the rubber composition is flowed into the damaged portion 37', whereby the flash 16 is irregularly thickened. Since the depth of the damage is generally 2 to 3 mm, a thickness of the irregular portion of the flash 16 is also approximately 2 to 3 mm.

Figure 4:
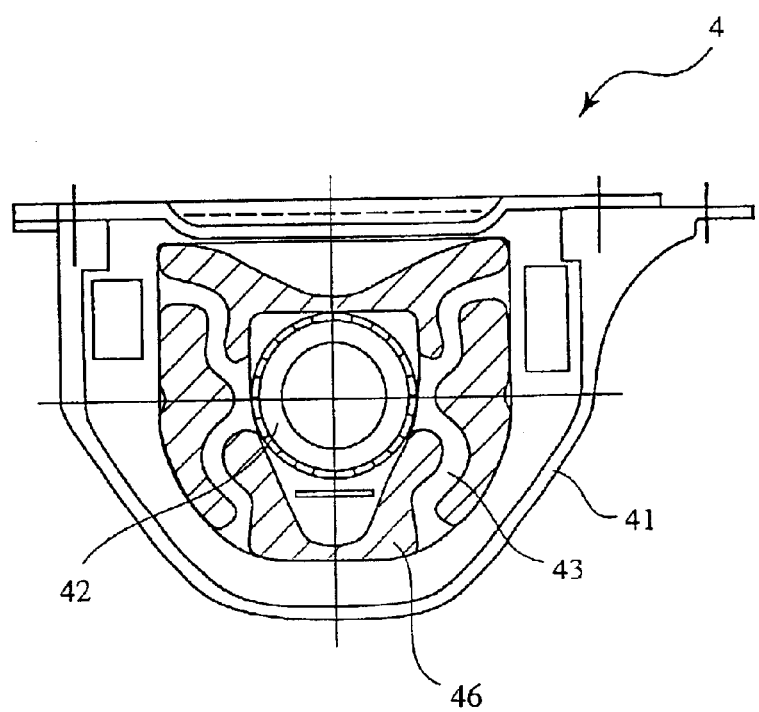
FIG. 4 is a front view showing a vibration-insulating rubber molded product for an engine according to another embodiment of the present invention.

FIG. 4 shows a vibration-insulating rubber molded product 4 for an engine according to another embodiment of the present invention. This vibration-insulating rubber molded product 4 has an outer barrel 41, an inner barrel 42, and a rubber part 43 integrally formed so as to connect them. The rubber part 43 has flashes 46.

Figure 5:
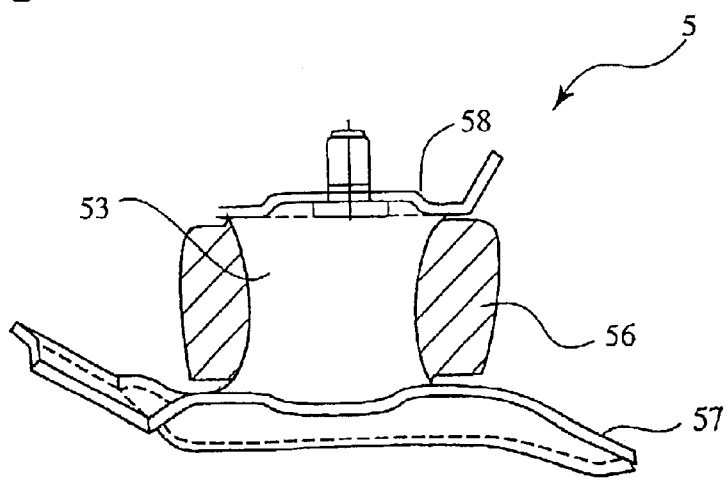
FIG. 5 is a front view showing a vibration-insulating rubber molded product for an engine according to further embodiment of the present invention.

FIG. 5 shows a vibration-insulating rubber molded product 5 for an engine according to further embodiment of the present invention. This vibration-insulating rubber molded product 5 has a body 57, an engine 58, and a rubber part 53 integrally formed so as to connect them. The rubber part 53 has flashes 56.

Figure 6:
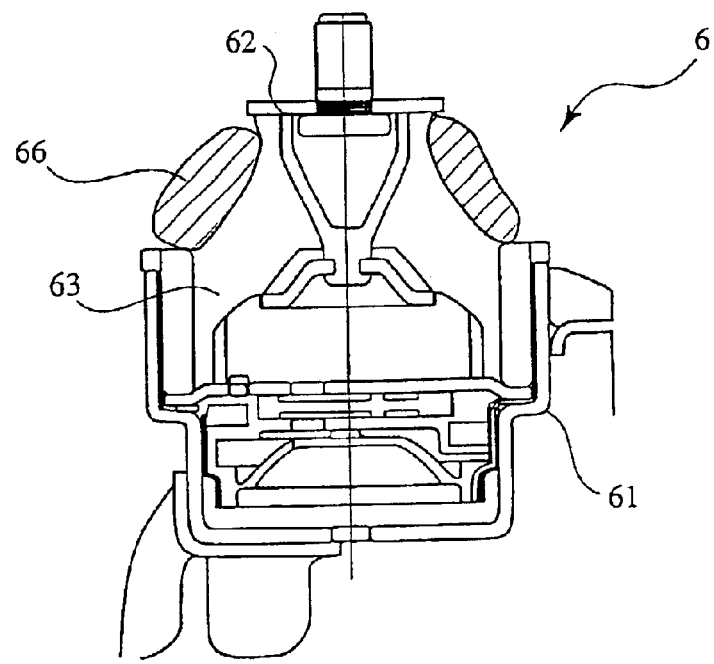
FIG. 6 is a front view showing a vibration-insulating rubber molded product for an engine according to further embodiment of the present invention.

FIG. 6 shows a vibration-insulating rubber molded product 6 for an engine according to further embodiment of the present invention. This vibration-insulating rubber molded product 6 has an LWR fitting 61, a UPR fitting 62, and a rubber part 63 integrally formed so as to connect them. The rubber part 63 has flashes 66.

Figure 7:
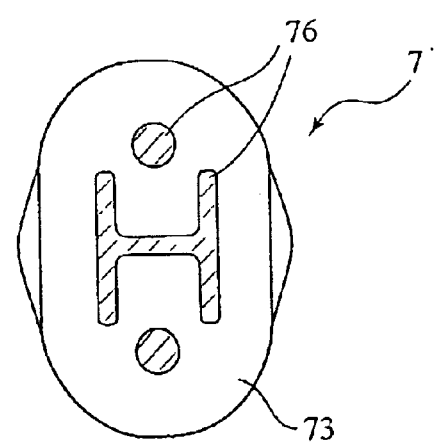
FIG. 7 is a front view showing a vibration-insulating rubber molded product for an exhaust pipe according to further embodiment of the present invention.

FIG. 7 shows a vibration-insulating rubber molded product 7 for an exhaust pipe according to further embodiment of the present invention. The rubber part 73 of this vibration-insulating rubber molded product 7 also has flashes 76.

[3] Method for Producing Vibration-Insulating Rubber Molded Product

As shown in FIG. 3, the parts to be integrally formed with the rubber part, for example, the outer barrel 11 and the inner barrel 12 are placed in the cavity of the mold 3 first. Then, the middle molds 33a and 33b are closed, the upper mold 31 is closed, and the mold 3 is heated to the vulcanizing temperature.

Next, the fused rubber composition is injected to the cavity from the gate 31a of the upper mold 31, and vulcanized. Eventually, the molds are opened to take out the molded product.

EXAMPLES

The present invention will be explained in further detail by the following EXAMPLES without intention of restricting the scope of the present invention defined by the claims attached hereto.

Example 1

Figure 8:
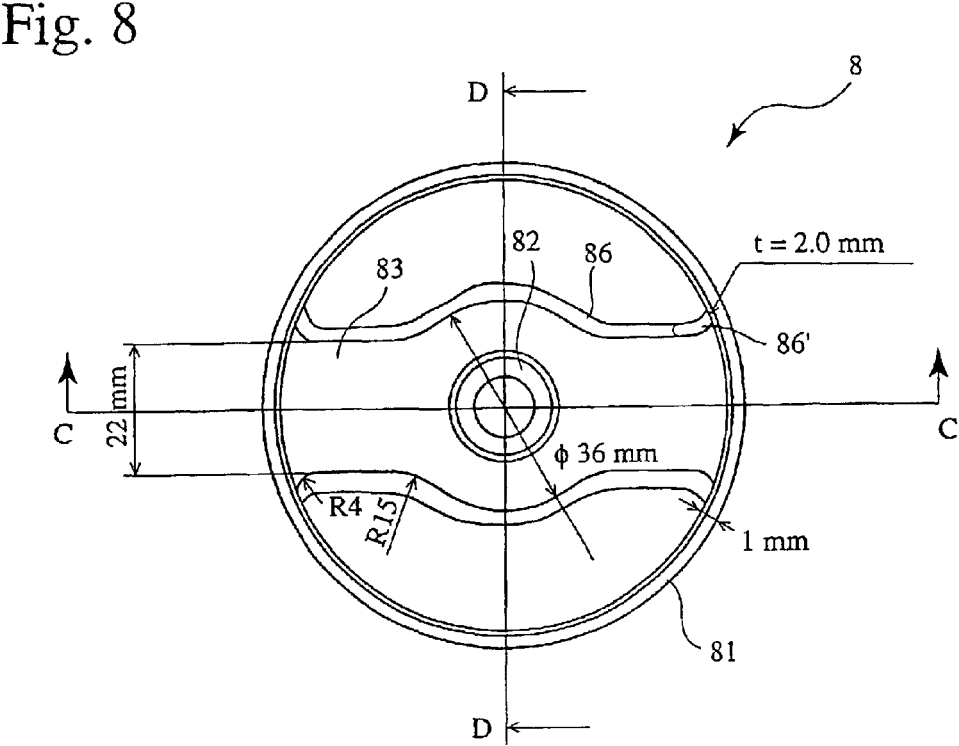
FIG. 8 is a front view showing a sample of the vibration-insulating rubber molded product produced and measured in EXAMPLE 1.
Figure 9:
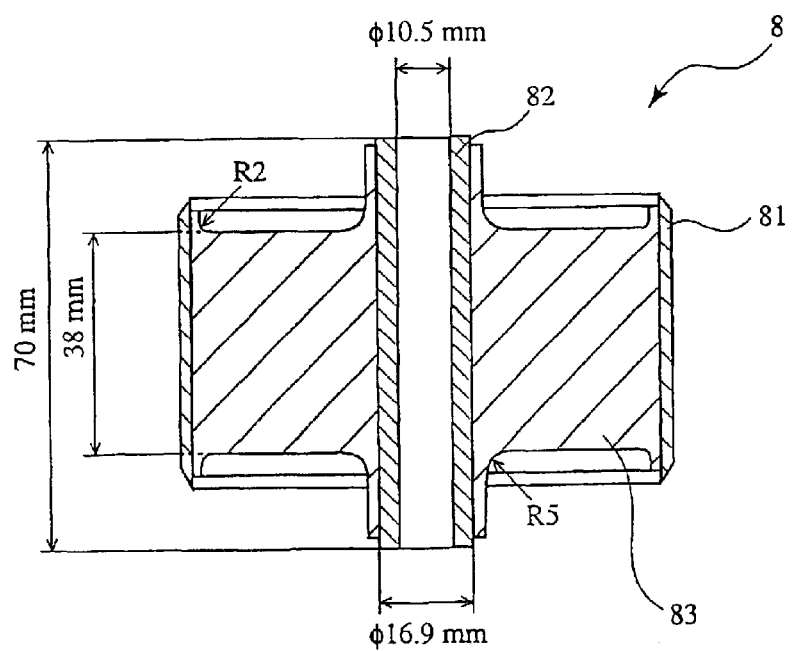
FIG. 9 is a C—C cross-sectional view of FIG. 8.
Figure 10:
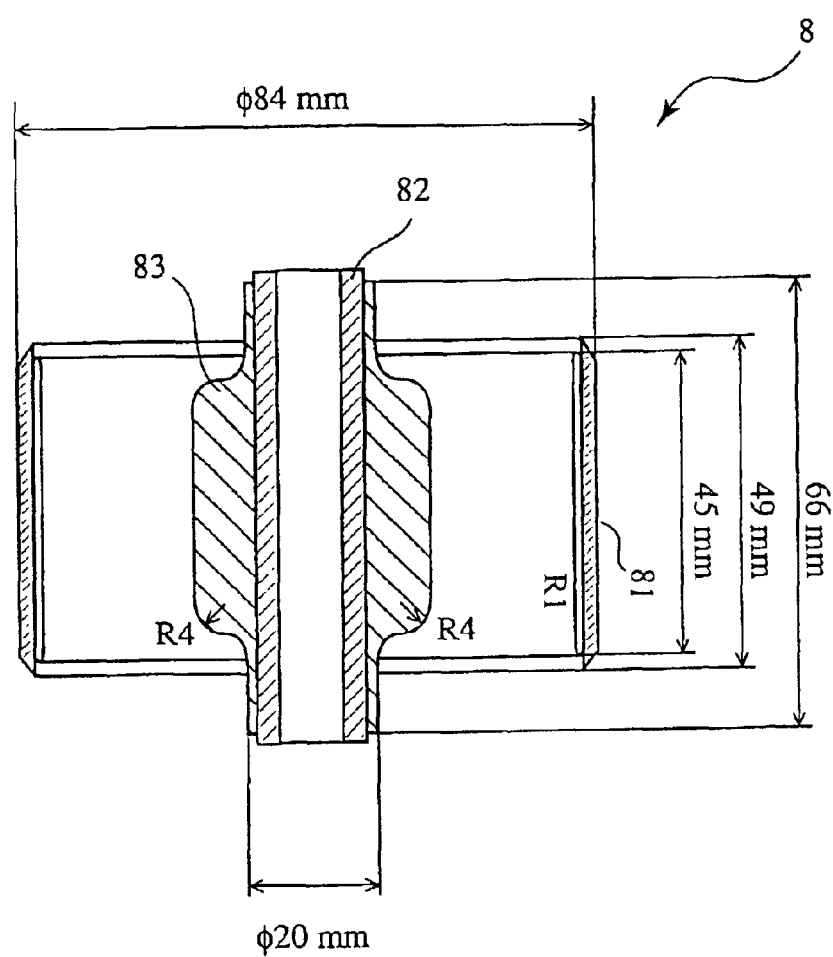
FIG. 10 is a D—D cross-sectional view of FIG. 8.

The sample of the vibration-insulating rubber molded product 8 shown in FIGS. 8 to 10 was produced by the mold shown in FIG. 3. FIG. 8 is a front view showing it, FIG. 9 is a C—C cross-sectional view of FIG. 8, and FIG. 10 is a D—D cross-sectional view of FIG. 8. The vibration-insulating rubber molded product, 8 has an outer barrel 81, an inner barrel 82, and a rubber part 83 integrally formed so as to connect them, having an I-shaped cross section. The rubber part 83 has flashes 86 on both sides. The size of the sample is shown in FIGS. 8 to 10.

The rubber part 83 was made of the composition comprising 100 parts of EPDM "601F" manufactured by Sumitomo Chemical Co., Ltd., 40 phr of a silica powder having an average particle size of 11 $\mu$m, 2 phr of FT carbon black, 4 phr of zinc oxide, 1 phr of stearic acid, and 2 phr of a coupling agent. Further, 2.7 phr of the organic peroxide (dicumyloyl peroxide) and a small amount of sulfur were added to the composition as vulcanizer. The vulcanizing temperature was 170° C.

With respect to the normal sample produced by a mold comprising a contact portion 37 with no cutout, and the irregular sample produced by a mold comprising a contact portion 37 with a cutout 37' having a depth of 2 mm, the thickness of the flash 86 was measured, and the color and light-transmittance thereof were visually observed, respectively. As a result, the flash of the normal sample had a thickness of approximately 0.3 to 0.5 mm, and was substantially transparent or translucent with white or gray color. If the light transmittance of air was 100% and that of a perfect black body was 0%, that of the flash of the normal sample was 40 to 60%. As compared with this, the flash of the irregular sample had a thickness of approximately 2 to 3 mm, and was substantially opaque with black color. The light-transmittance of the flash thereof was 5% or less. As is clear from this, the irregularity of the flash can be found by visually observing the light-transmittance thereof with respect to the vibration-insulating rubber molded product of the present invention.

Figure 11:
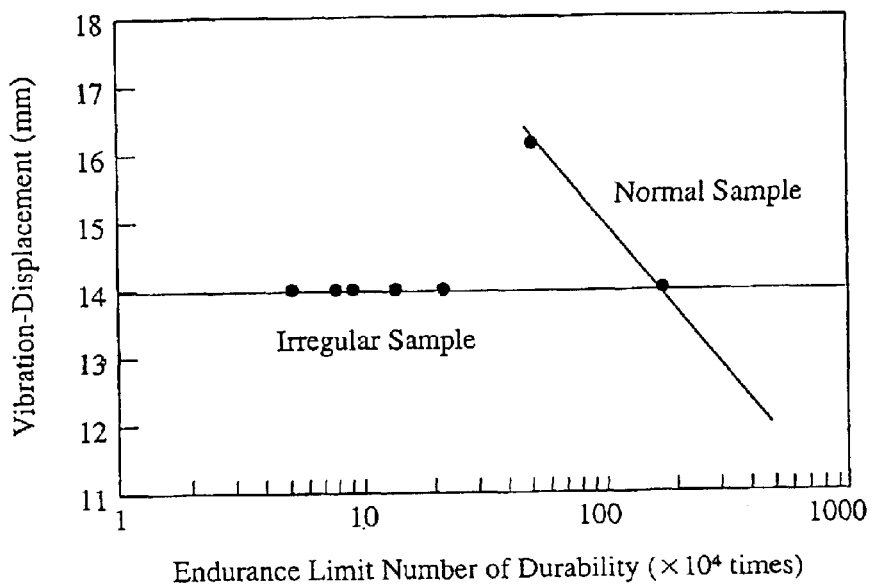
FIG. 11 is a graph showing a relation between vibration-displacement and endurance limit number of durability according to each of a normal sample and an irregular sample of EXAMPLE 1.

Next, the normal sample and the irregular sample were made to vibrate in a displacement of 14 mm, and measured with respect to the number of vibrations by which the rubber part 83 was cracked, respectively. The normal sample was further measured with respect to the number of vibrations having a displacement of 16 mm by which the rubber part 83 was cracked. Shown in FIG. 11 is the relation between the vibration-displacement and the number of vibrations by which the rubber part was cracked (endurance limit number of durability) according to each of the normal sample and the irregular sample. As shown in FIG. 11, the endurance limit number of durability of the normal sample was approximately 500,000 times in the case of vibration-displacement of 16 mm, and nearly 2,000,000 times in the case of 14 mm. As compared with this, the endurance limit number of durability of the irregular sample was fewer, 40,000 to 200,000 times.

Example 2

Figure 12:
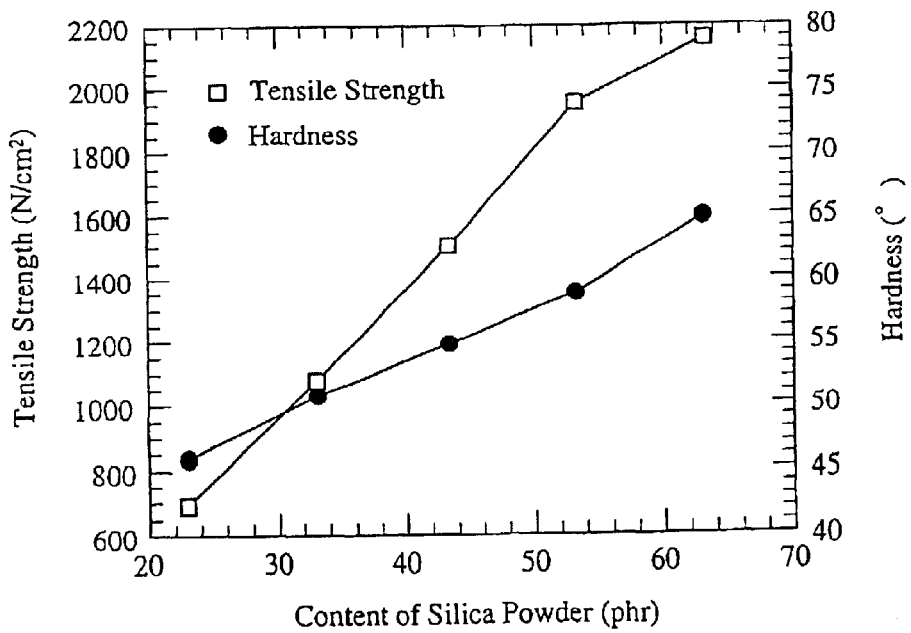
FIG. 12 is a graph showing a relation between the content of a silica powder, and tensile strength and hardness according to the EPDM rubber composition used in EXAMPLE 1.

The EPDM rubber composition used in EXAMPLE 1 was measured with respect to tensile strength and hardness while changing the content of the silica, powder. Shown in FIG. 12 is a relation between the content of the silica powder, and the tensile strength and hardness. As is clear from FIG. 12, the more content of the silica powder is, the more the tensile strength and hardness are increased.

Example 3

Figure 13:
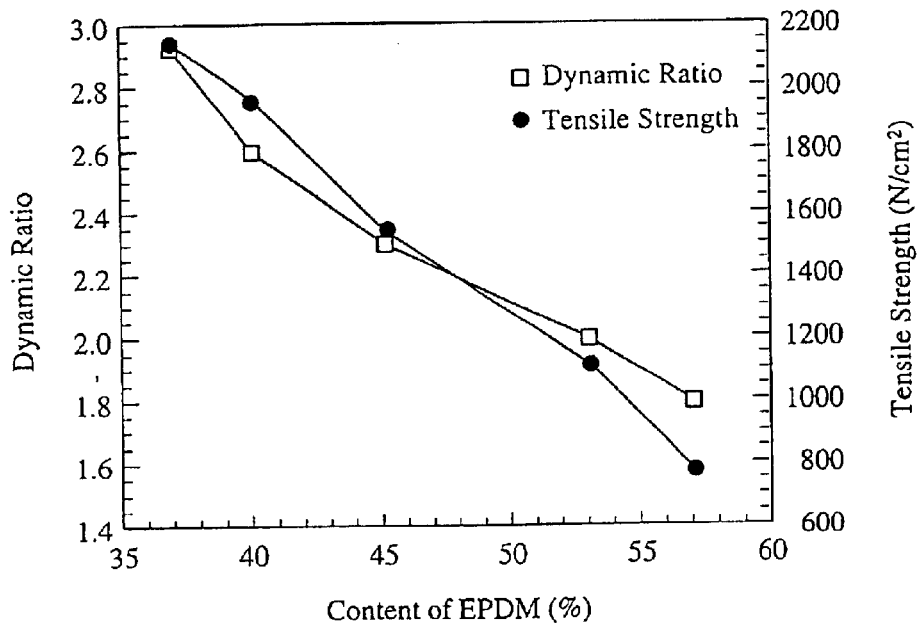
FIG. 13 is a graph showing a relation between the content of EPDM, and dynamic ratio and tensile strength according to the EPDM rubber composition used in EXAMPLE 1.

The EPDM rubber composition used in EXAMPLE 1 was measured with respect to dynamic ratio and tensile strength while changing the content of EPDM. The results are shown in FIG. 13. As is clear from FIG. 13, the more content of EPDM is, the less the dynamic ratio and tensile strength are.

Example 4

Figure 14:
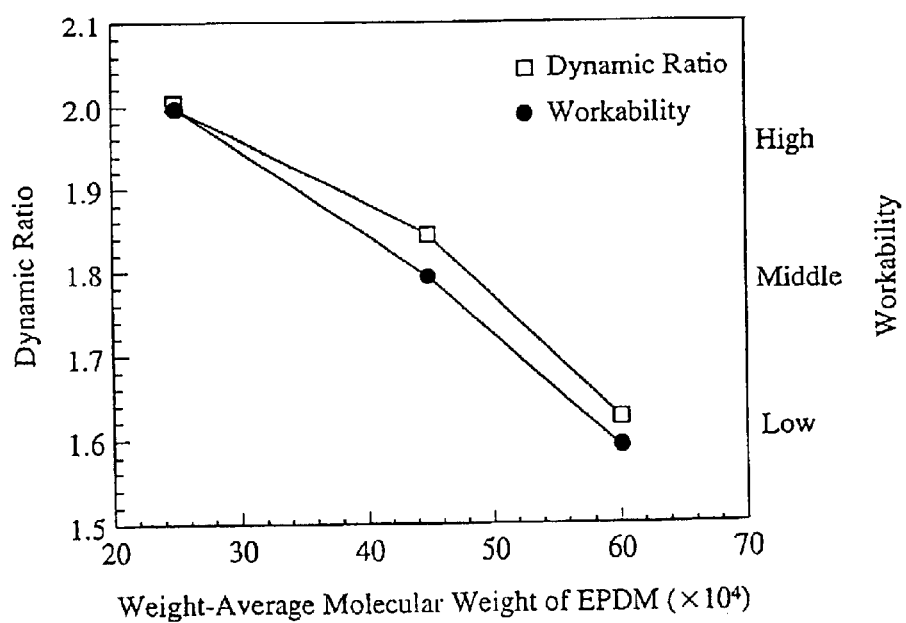
FIG. 14 is a graph showing a relation between a weight-average molecular weight of EPDM, and dynamic ratio and workability according to the EPDM rubber composition used in EXAMPLE 1.

The EPDM rubber composition used in EXAMPLE 1 was measured with respect to dynamic ratio and workability while changing the weight-average molecular weight of EPDM. The results are shown in FIG. 14. As is clear from FIG. 14, the more the weight-average molecular weight of EPDM is, the less the dynamic ratio and workability are.

Example 5

Figure 15:
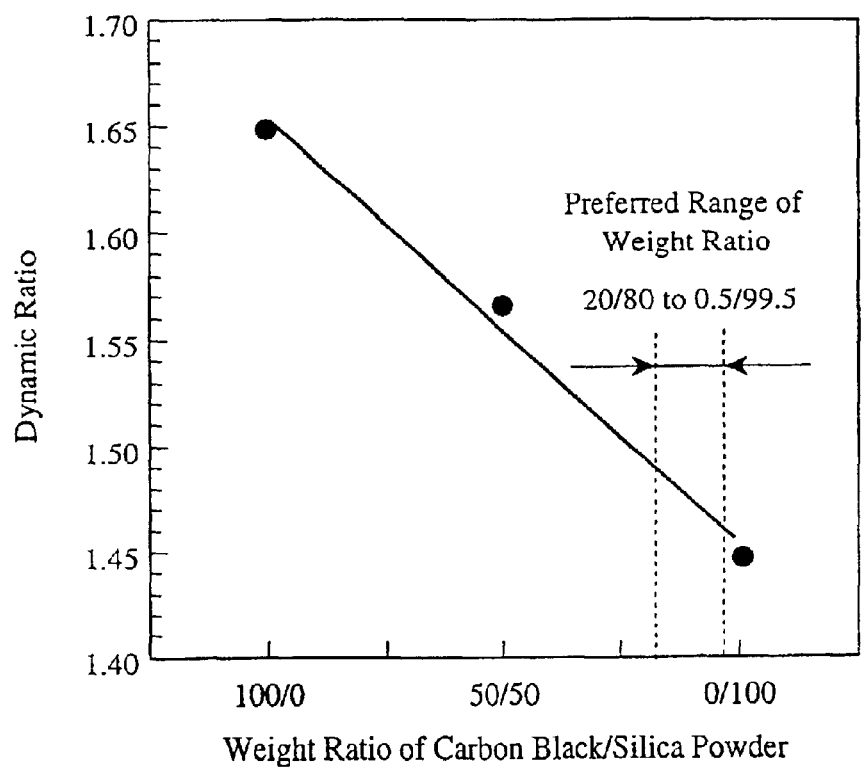
FIG. 15 is a graph showing a relation between a weight ratio of a carbon black/a silica powder and dynamic ratio according to the EPDM rubber composition used in EXAMPLE 1.

The EPDM rubber composition used in EXAMPLE 1 was measured with respect to dynamic ratio while changing the weight ratio of the carbon black/the silica powder. The results are shown in FIG. 15. As is clear from FIG. 15, the more the weight ratio is, the less the dynamic ratio is. As shown in FIG. 15, the weight ratio of the carbon black/the silica powder was preferably in the range of 20/80 to 0.5/99.5, and the irregular portion of the flash can be easily evaluated by visual observation in the case of this range.

As described in detail above, according to the vibration-insulating rubber molded product with flash of the present invention comprising the silica powder and the carbon black, the content of the carbon black is adjusted such that a normal, thinner portion in the flash is light-transmittable, and that a irregular, thicker portion in the flash is substantially opaque. Therefore, whether the flash has a thicker portion due to an ill-conditioned mold can be easily evaluated only by visually observing the color of the flash in the vibration-insulating rubber molded product. According to the present invention, defects such as a cutout of the molded product caused by the irregularly thicker flash portion can be sufficiently prevented, and the damage of the mold can be found with ease.

What is claimed is:

1. A method for evaluating a mold for molding a vibration-insulating rubber molded product having flash, said method comprising:

adding a silica powder and a carbon black to a rubber component, the content of said carbon black being determined such that (a) a portion having a thickness of 1 mm or less in said flash of the resultant vibration-insulating rubber molded product is substantially transparent or translucent with white or gray color, and that (b) a portion having a thickness of 2 mm or more in said flash is substantially opaque with black color;

visually observing said flash to know whether or not said flash is substantially transparent or translucent with white or gray color or substantially opaque with black color; and determining that said mold does not have any damage when said flash is substantially transparent or translucent with white or gray color.

2. The method according to claim 1, wherein the content of said silica powder is 20 to 70 phr and the content of said carbon black is 1 to 3 phr per 100 parts of said rubber component, and a weight ratio of said carbon black/said silica powder is 20/80 to 0.5/99.5.

3. The method according to claim 1, wherein said rubber component is an ethylene-propylene-diene rubber having a weight-average molecular weight of 400,000 or more.

4. The method according to claim 1, wherein said vibration-insulating rubber molded product further comprises 3 to 8 weight % of a coupling agent based on 100 weight % of said silica powder.

5. The method according to claim 1, wherein a light transmittance of said flash is 20% or more in a portion having a thickness of 1 mm, and 5% or less in a portion having a thickness of 2 mm.

* * * * *